United States Patent [19]

Tanaka et al.

[11] 4,413,297
[45] Nov. 1, 1983

[54] MAGNETIC RECORDING AND PLAYBACK APPARATUS OF PERPENDICULAR RECORDING TYPE

[75] Inventors: Motoharu Tanaka, Numazu; Hazime Machida, Tokyo; Hiroshi Kobayashi, Kodaira, all of Japan

[73] Assignee: Ricoh Company, Ltd., Tokyo, Japan

[21] Appl. No.: 266,330

[22] Filed: May 22, 1981

[30] Foreign Application Priority Data

May 23, 1980 [JP] Japan .................................. 55-68527

[51] Int. Cl.$^3$ .............................................. G11B 5/30
[52] U.S. Cl. ................................................... 360/119
[58] Field of Search ........................ 360/119, 121–123, 360/113, 110, 125; 29/603

[56] References Cited

U.S. PATENT DOCUMENTS 4,222,084 9/1980 Nakagawa et al. .................. 360/119
4,317,148 2/1982 Chi ...................................... 360/119

FOREIGN PATENT DOCUMENTS 55-87325 2/1980 Japan ................................... 360/123
1068398 5/1967 United Kingdom ................ 360/121

OTHER PUBLICATIONS

T. A. Schwarz, "Perpendicular Recording Read/Write Head with High Reluctance Leg", IBM, TDB, vol. 24, No. 4, Sep. 1981.

Primary Examiner—Alfred H. Eddleman
Assistant Examiner—Kin C. Wong
Attorney, Agent, or Firm—Guy W. Shoup; Gerard F. Dunne

[57] ABSTRACT

A magnetic recording and playback apparatus of perpendicular recording type comprises a main pole having a magnetic axis which is normal to a recording surface of a magnetic record medium, an auxiliary magnetic pole disposed in surrounding relationship with the main pole with a small clearance from the lateral side thereof, a coil disposed on part of the auxiliary pole, and a yoke having its one end connected to the auxiliary pole and having its other end of a relatively large area disposed in opposite relationship with the recording surface of the record medium. The free end of the main pole is disposed in contact with the surface of the record medium while the yoke is disposed at a given distance from the surface of the record medium. During a recording operation, a current is passed through the coil in accordance with information to be recorded. Thereupon, a magnetic flux is concentrated in the free end of the main pole to cause an inversion of magnetization in that region of a magnetic layer of the record medium which is contacted by the main pole, thus recording the information. During a playback operation, the free end of the main pole picks up a magnetic flux which depends on the magnetization, representing the information, recorded in the magnetic layer of the record medium, producing a corresponding current flow through the coil. An output current from the coil is utilized for reproduction of the recorded information.

20 Claims, 1 Drawing Figure

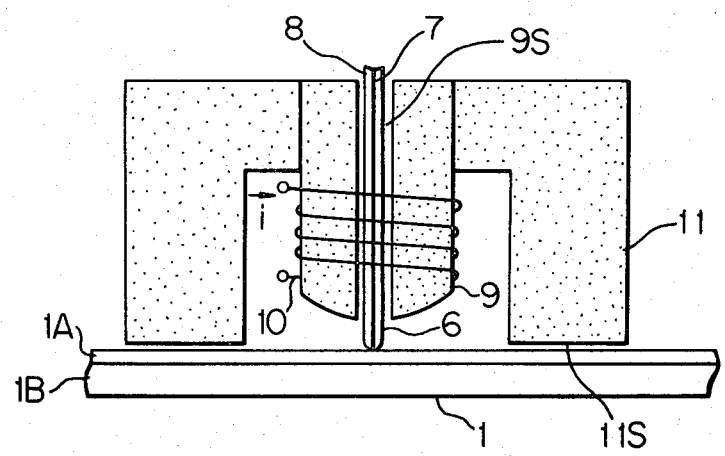

MAGNETIC RECORDING AND PLAYBACK APPARATUS OF PERPENDICULAR RECORDING TYPE

BACKGROUND OF THE INVENTION

This invention relates to an improvement of a magnetic recording and playback apparatus of perpendicular recording type which is used to achieve a high density magnetic recording on a magnetic record medium.

A conventional magnetic recording process which utilizes a ring-shaped head, as may be used in a tape recorder, is based on the recording or playback of magnetization vectors which are oriented lengthwise of a record medium. When the process is used to increase the recording density, not only the strength of magnetization decreases in a range of shorter wavelengths due to the demagnetization effect within the record medium, but a rotation of magnetization vectors occurs in the cross section of the medium, thus substantially reducing a reproduced signal output to defeat the very purpose of achieving a high density recording. To solve this problem, there has been proposed a perpendicular magnetic recording process (see Japanese laid-open patent applications No. 134,706/1977 and No. 34,205/1979) in which the demagnetization effect is reduced to substantially zero.

One of such techniques utilizes a main pole formed by a thin magnetic strip of a high permeability which is coated with a soft material, and an auxiliary pole on which a record/playback coil is disposed, both of which are disposed in opposing relationship with each other with a record medium placed therebetween. In this manner, a magnetic flux from the auxiliary pole is concentrated onto the recording axis of the main pole to achieve a local inversion of magnetization in the record medium, thus recording information. However, the technique suffers from the following disadvantages:

1. Because the main pole and the auxiliary pole are disposed in opposing relationship with each other with the record medium placed therebetween, a difficulty is experienced in positioning the poles relative to each other, particularly when a multihead device is contemplated.

2. A magnetic circuit formed by the combination of the main and auxiliary pole represents an open magnetic path, whereby magnetic lines of force spread largely into the open space to increase the reluctance of the magnetic circuit and to degrade the energy efficiency. Thus, it is necessary to pass a current of an increased magnitude through the coil on the auxiliary pole when recording.

3. When reproducing recorded information, the magnitude of an output depends on the strength of magnetization vectors, which represent a signal source in the record medium, and is inversely proportional to the reluctance of the magnetic circuit, so that the signal-to-noise ratio is very poor during the playback.

An apparatus according to another proposed technique utilizes a recording yoke disposed in opposing relationship with a recording surface of a record medium and having a surface of a relatively small area which is disposed opposite to the record medium. In addition, an auxiliary yoke is disposed in surrounding relationship with the recording yoke except for its portion located opposite to the recording surface, and having a surface of a relatively large area which is disposed opposite to the record medium. A coil is disposed on the auxiliary yoke. When recording, magnetic lines of force form a closed magnetic path including the auxiliary yoke, the record medium and the recording yoke. Flux from the auxiliary yoke is concentrated into the recording yoke, which is effective to write information into the record medium.

While flux concentration into the recording yoke is achieved when recording, the technique suffers from the fact that a reduced area (S) and an increased length (l) of the recording yoke result in an increased magnitude of reluctance (Rm), as expressed by the following relationship:

$$Rm \alpha l/S$$

Because no magnetic shield is provided around the recording yoke, a leakage of flux from the recording yoke may make the recording and playback uncertain.

SUMMARY OF THE INVENTION

It is an object of the invention to provide a magnetic recording and playback apparatus of perpendicular recording type which permits write-in power to be reduced and read output to be increased while avoiding a leakage of magnetic flux which carries the information.

It is another object of the invention to provide a magnetic recording and playback apparatus of perpendicular recording type in which a main pole and an axuliary pole are formed as a composite construction which is disposed on one side of a magnetic record medium to enable a perpendicular magnetic recording and which lends itself to the construction of a multihead device.

It is a further object of the invention to provide a magnetic recording and playback apparatus of perpendicular recording type which enables a reliable recording and playback operation.

Above objects are achieved in accordance with the invention by providing a magnetic recording and playback apparatus of perpendicular recording type which comprises a main pole having a magnetic axis which is disposed normal to a recording surface of a magnetic record medium, an auxiliary pole disposed in surrounding relationship with the main pole with a small clearance from the laterial side thereof, a coil disposed on the auxiliary pole for recording information into the record medium and for detecting a change in a magnetic flux which occurs in the record medium, and a yoke having its one end connected to the auxiliary yoke and its other end of a relatively large area disposed opposite to a recording surface of the record medium, the free end of the main pole being disposed in contact with the surface of the record medium while the yoke is disposed at a given distance from the surface of the record medium.

To achieve above and other objects, in accordance with the invention, the main pole is constructed in the form of a pillar formed by a thin magnetic strip of high permeability which is surrounded by a soft protective material, and as the main pole becomes abraded, it is fed forward in small increment, thus always assuring a complete contact between the main pole and the record medium.

BRIEF DESCRIPTION OF THE DRAWING

The single drawing is an elevational view, partly in section, of an embodiment of a magnetic recording and playback apparatus of perpendicular recording type of the invention.

DESCRIPTION OF EMBODIMENT

Referring to the drawing, there is shown a magnetic recording and playback apparatus of perpendicular recording type which is constructed according to one embodiment of the invention. A magnetic record medium 1 comprises a magnetic layer 1A and a base layer 1B. The magnetic layer 1A may be formed of a material which exhibits a strong monaxial anisotropy in a direction normal to the surface thereof. By way of example, it may comprise an RF sputtered film of Cr-Co alloy, Gd-Co alloy, Gd-Fe alloy, Tb-Fe alloy, and Dy-Fe alloy or an evaporated film of Mn-Bi alloy. The base layer 1B may comprise a substrate of a material such as glass, ceramic or plastics on which a thin film of high permeability material, for example, permalloy, Mn-Zn ferrite, is formed as by sputtering, or may comprise a high permeability sheet of permalloy, Mn-Zn ferrite or the like.

A main pole 6 is disposed in a direction normal to the magnetic layer 1A of the record medium 1 so as to be brought into contact therewith. The main pole 6 comprises a thin strip 7 of a high permeability material such as permalloy, Mn-Zn ferrite, for example, which is surrounded by a soft protective material 8. The free end of the main pole 6 is maintained in contact with the magnetic layer 1A of the record medium 1, and hence is subject to abrasion. The protective material 8 is formed by a soft material such as a plastic so that it is subject to abrasion as the main pole is abraded, in the same manner as a consumed pencil is shaved. The high permeability strip 7 is in the form of a rectangular pillar having a cross-sectional area which is several micrometers long and less than one micrometer wide in order to achieve a high density magnetic recording.

An auxiliary pole 9 is disposed in surrounding relationship with the main pole 6 with a small gap 9S therebetween. A coil 10 is disposed on the auxiliary pole 9, and the number of turns thereof helps determine the field strength. Material for the auxiliary pole 9 should exhibit a high permeability and a good frequency response, and, for example, ferrite may be used. A write signal is indicated at i. A yoke 11 is used to form a closed magnetic path. In this manner, magnetic lines of force extend from the auxiliary pole 9 through the main pole 6, the magnetic layer 1A and the base layer 1B of the record medium 1 and the yoke 11, thus following a closed path. The material of the yoke 11 should exhibit a high permeability and a good frequency response, such as ferrite, for example. The yoke 11 is disposed to leave a very small air gap between it and the magnetic layer 1A of the record medium 1 when the apparatus is operative in order to avoid the detection of any flux from regions of the record medium which are located opposite to the yoke 11, thus allowing the coil to be responsive to only the flux passing through the main pole 6.

It will be noted that in its region opposite to the record medium 1, the yoke 11 exhibits a surface 11S of an increased area in order to form a closed path which prevents an external leakage of the flux detected by the main pole 6 and to reduce the reluctance, thus assuring a reliable readout of information from the record medium 1.

In operation, a current corresponding to information to be recorded is passed through the coil 10 disposed on the auxiliary pole 9. In response thereto, magnetic flux is concentrated into the free end of the main pole 6, and only a region of the magnetic layer 1A which is in contact with the main pole 6 is subject to an inversion of magnetization, thus recording the information. During a playback operation, the free end of the main pole 6 detects a magnetic flux which is produced by the magnetization recorded in the magnetic layer 1A, and induces a corresponding current through the coil 10, an output current of which is utilized to provide information retrieval.

As discussed above, with the apparatus of the invention, the disposition of the auxiliary pole in surrounding relationship with the main pole avoids any leakage of information flux, thus allowing write-in power to be reduced and read output to be increased. Both the main and the auxiliary poles are formed as a composite structure which can be disposed on one side of the record medium, thus permitting a pependicular recording. In addition, the arrangement can be adapted to a multihead construction. A reliable recording and playback is achieved by assuring a complete contact between the main pole and the record medium since the main pole is in the form of a pillar comprising a high permeability strip surrounded by a soft protective material so as to permit the main pole to be fed forward in small increment as it is abraded.

What is claimed is:

1. A magnetic recording and playback apparatus adapted to record information in a recording surface of a magnetic record medium in a perpendicular orientation thereto; the apparatus comprising a main pole having a magnetic axis adapted to be disposed normal to a recording surface of the record medium, an auxiliary pole disposed in surrounding relationship with the main pole and having a small clearance from the lateral side thereof, a coil disposed around the auxiliary pole for recording information into the record medium and for detecting a change in a magnetic flux produced in the record medium, and a yoke having its one portion connected to the auxiliary pole and another portion of a relatively large area disposed opposite to a recording surface of the record medium, an end of the main pole being disposed in contact with the surface of the record medium while the yoke being disposed at a given distance from the surface of the record medium.

2. An apparatus according to claim 1 in which the record medium comprises a base layer and a magnetic layer, the magnetic layer being formed of a material which exhibits a strong monaxial anisotropy in a direction perpendicular to the surface thereof, the base layer being formed of a substrate of non-magnetic material on which a thin film of a high permeability material is formed.

3. An apparatus according to claim 1 in which the main pole is disposed so as to be capable of contacting the magnetic layer of the record medium in a perpendicular orientation, the main pole being formed by a thin strip of a high permeability material which is surrounded by a soft protective material, said end of the main pole being maintained in contact with the magnetic layer of the record medium.

4. An apparatus according to claim 3 in which the protective material associated with the main pole is formed of a soft material which can be abraded as a result of its contact with the magnetic layer as the main pole becomes abraded.

5. An apparatus according to claim 3 in which the high permeability strip is in the form of a rectangular pillar having a cross section which is several micrometer long and less than one micrometer wide.

6. An apparatus according to claim 1 in which the auxiliary pole is disposed in surrounding relationship with the main pole with a small gap from the latter, and carries the coil thereon.

7. An apparatus according to claim 6 in which the auxiliary pole is formed of a material which exhibits a high permeability and a good frequency response.

8. An apparatus according to claim 1 in which the yoke is formed of a material which exhibits a good frequency response and a high permeability.

9. An apparatus according to claim 1 in which the yoke is disposed to leave a small air gap between the yoke and the magnetic layer of the record medium when the apparatus is operative.

10. An apparatus according to claim 1 in which magnetic lines of force from the main pole follow a closed magnetic path including the auxiliary pole, main pole, the magnetic layer and the base layer of the record medium and the yoke.

11. An apparatus according to claim 1 in which the yoke has a surface disposed opposite to the record medium which has as large an area as possible.

12. An apparatus according to claim 1 in which a current corresponding to information to be recorded is passed through the coil during a recording operation while a current corresponding to a magnetic flux which depends on the strength of magnetization recorded in the record medium passes through the coil during a playback operation.

13. An apparatus according to claim 12 including means for concentrating magnetic flux into said end of the main pole in response to current flow through the coil during a recording operation, whereby only that portion of the magnetic layer of the record medium which is in contact with the main pole is subject to an inversion of magnetization, thus recording the information.

14. An apparatus according to claim 1 in which the record medium comprises a base layer and a magnetic layer, the magnetic layer being form of a material which exhibits a strong monaxial anisotrophy in a direction perpendicular to the surface thereof, the base layer being formed of a substrate of a high permeability material.

15. An apparatus according to claim 7, the material of said auxiliary pole being ferrite.

16. An apparatus according to claim 8, the material of said yoke being ferrite.

17. A magnetic recording and playback apparatus adapted to record information in a perpendicular orientation of a magnetic recording medium, comprising a main pole having the end of its magnetic axis held in contact with a recording surface of the magnetic record medium at right angles thereto, an auxiliary pole surrounding the main pole, a coil disposed on a portion of said auxiliary pole for recording information into said magnetic record medium and for detecting a change in a magnetic flux which occurs in said magnetic record medium, and a yoke having its one end connected to said auxiliary pole, said main pole being covered with a protective, soft material, and a gap being formed between said protective material and said auxiliary pole so that the protective material may be moved together with said main pole toward the magnetic axis as said main pole is abraded by said recording surface.

18. An apparatus for recording or receiving information recorded on a magnetic recording medium, including means for recording information in said medium by orientating magnetic domains thereof in a direction perpendicular to the surface of said medium, said means including an elongate main pole orientated perpendicular to said medium and having an end adapted to be held continually in contact with said medium during recording or receiving information therefrom, an auxiliary pole spaced in surrounding relation to said main pole and having signal means including a coil wound at least partially therearound for either producing a magnetic flux in said main pole for orientating magnetic domains perpendicularly within said medium or producing a signal corresponding to a change in magnetic flux produced in said main pole by magnetic domains previously orientated perpendicularly within said medium, and means including a yoke providing a low reluctance path for magnetic flux between said medium and said auxiliary pole, said yoke being connected to said auxiliary pole and extending to portions spaced a predetermined distance from said medium.

19. An apparatus according to claim 18, said portions having a surface area facing said medium substantially larger than the cross-sectional area of said main pole.

20. An apparatus according to claim 18, said main pole being movable within said auxiliary pole to assure its end will be held continually in contact with said member during recording or receiving information.

* * * * *